US011367320B2

(12) United States Patent
Tian et al.

(10) Patent No.: US 11,367,320 B2
(45) Date of Patent: Jun. 21, 2022

(54) SYSTEMS AND METHODS FOR PART IDENTIFICATION

(71) Applicant: Caterpillar Inc., Peoria, IL (US)

(72) Inventors: Ye Tian, Bloomington, IL (US); Grant Michael Klobuchar, Morton, IL (US); Brenton William Bush, Peoria, IL (US); Stephan Donald Roozenboom, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 218 days.

(21) Appl. No.: 16/580,970

(22) Filed: Sep. 24, 2019

(65) Prior Publication Data

US 2021/0090362 A1 Mar. 25, 2021

(51) Int. Cl.
*G07C 5/08* (2006.01)
*G06K 7/10* (2006.01)
*G06K 19/077* (2006.01)
*H04L 67/12* (2022.01)

(52) U.S. Cl.
CPC ....... *G07C 5/0875* (2013.01); *G06K 7/10366* (2013.01); *G06K 19/07773* (2013.01); *H04L 67/12* (2013.01)

(58) Field of Classification Search
CPC ............ G07C 5/0875; G06K 7/10366; G06K 19/07773; H04L 67/12
See application file for complete search history.

(56) References Cited

U.S. PATENT DOCUMENTS

| 8,673,137 | B2 | 3/2014 | Verdegan et al. | |
|---|---|---|---|---|
| 8,810,364 | B2 | 8/2014 | Komine et al. | |
| 2004/0041696 | A1* | 3/2004 | Hull | G06K 7/0008 340/10.42 |
| 2005/0045537 | A1* | 3/2005 | Imanse | B01D 29/118 210/407 |
| 2016/0305246 | A1 | 10/2016 | Welch et al. | |
| 2018/0040174 | A1 | 2/2018 | Koshi | |
| 2020/0009485 | A1* | 1/2020 | Okoro | B01D 35/143 |

FOREIGN PATENT DOCUMENTS

| JP | 4399524 B2 | 1/2010 |
|---|---|---|
| JP | 5243589 B2 | 4/2013 |
| WO | WO2019090319 A1 | 5/2019 |

* cited by examiner

*Primary Examiner* — James J Yang
(74) *Attorney, Agent, or Firm* — Lee & Hayes, PLLC

(57) ABSTRACT

A system includes an ECM configured to control at least one subsystem of a machine, a plurality of sensors communicatively coupled to the ECM, the plurality of sensors configured to sense at least one identification device coupled to a fluid filter associated with the subsystem of the machine. A memory stories instructions that, when executed by the ECM, cause the ECM to cause a sensor of the plurality of sensors to sense the at least one identification device, receive a signal from the sensor based on the sensor sensing the at least one identification device, identify a coupling of the fluid filter to the machine based on the signal; and identify at least one physical characteristic of the fluid filter based on a code defined by electromagnetic energy generated by the at least one identification device. The code includes at least one component defining the at least one physical characteristic.

11 Claims, 6 Drawing Sheets

SYSTEMS AND METHODS FOR PART IDENTIFICATION

TECHNICAL FIELD

The present disclosure relates to systems and methods for part identification. More specifically, the present disclosure relates to systems and method of identifying a service component, such as a filtration device, using an array of sensors and identification devices.

BACKGROUND

Vehicles and machines of various types and utilities may include a number of parts or service components (individually referred to herein as a "part" and collectively referred to herein as "parts") that may be replaced due to wear on the part or depletion of the service life of the part. The service life of the part may be defined as the total life of the part from the point of sale to the point of discard, and may represent a commitment made by a manufacture that the part may function as intended and be serviceable at a performance level as dictated by the manufacturer.

Once the service life of the part has been exhausted or the part has worn to the point that replacement is due, the part may be replaced. In some instances, the part may be replaced with a non-genuine or a non-authorized replacement part. In these instances, the system operator and/or the service technician may not know that a non-genuine or non-authorized part has been installed due to misidentification of the replacement part, replacement with an equivalent aftermarket and/or non-original equipment manufacturer ("OEM") thought to be equivalent to an OEM part, or even non-OEM parts that include advanced counterfeiting techniques used by third parties to sell parts that look like genuine OEM parts but that may include inferior qualities or characteristics. In these instances, the non-authorized part may not conform to original manufacturer performance and/or safety parameters. In such examples, use of the non-authorized part may result in damage to downstream components or other components within the vehicle.

An example system for service component authenticity detection is described in International Patent Application Publication No. WO2019090319A1 (hereinafter referred to as "the '319 reference"). In particular, the '319 reference describes determining whether an authorized or genuine service component element is installed in an automotive system. The authorized service component determination of the '319 reference is based on close-range communication technology such as radio frequency identification ("RFID") technology where an antenna in the sensor module reads the tag information from installed service component elements in a nearby service component and sends any detected information into a filtration monitoring system. A monitoring system analyzes the returned data to determine if a genuine service component element is installed or not.

The '319 reference does not, however, employ magnetic or optical sensors devices. Further, the '319 reference does not describe any type of coding of data obtained from an identification device. Still further, the '319 reference does not describe the use of an array of sensors and/or identification devices in determining additional information regarding an installed part or serialization of the part. As a result, the system described in the '319 reference cannot assist a user such as a mechanic in determining whether an acceptable part has been coupled to a machine and the physical characteristics of the part based on a code defined by an array of identification devices.

Examples of the present disclosure are directed toward overcoming the deficiencies described above.

SUMMARY

In an example of the present disclosure, a system includes an electronic control module ("ECM") configured to control at least one subsystem of a machine, a plurality of sensors communicatively coupled to the ECM, the plurality of sensors configured to sense at least one identification device coupled to a fluid filter associated with the subsystem of the machine, and a memory operably connected to the ECM, the memory storing instructions. The instructions, when executed by the ECM, cause the ECM to cause a sensor of the plurality of sensors to sense the at least one identification device, receive a signal from the sensor based on the sensor sensing the at least one identification device, identify a coupling of the fluid filter to the machine based on the signal, and identify at least one physical characteristic of the fluid filter based on a code defined by electromagnetic energy generated by the at least one identification device. The code includes at least one component defining the at least one physical characteristic.

In another example of the present disclosure, a fluid filter, includes a fluid inlet through which a fluid from a subsystem of a machine flows into the fluid filter, a fluid outlet fluidly connected to the fluid inlet, the fluid outlet permitting passage of filtered fluid to an engine of the machine, and a plurality of identification devices coupled to the fluid filter at a location at which at least one sensor located on the engine detects the plurality of identification devices. The plurality of identification devices produce electromagnetic energy detectable by the at least one sensor to define a code. The code includes at least one component defining that indicates at least one physical characteristic of the fluid filter.

In yet another example of the present disclosure, a method includes, with an ECM configured to control at least one subsystem of a machine, controlling an array of sensors communicatively coupled to the ECM to sense an array of identification devices coupled to a part within the subsystem of the machine, and identify information regarding the part based on a code defined by detected electromagnetic energy produced by the array of identification devices. The code includes at least one component defining at least one physical characteristic of the part.

DETAILED DESCRIPTION

Figure 1:
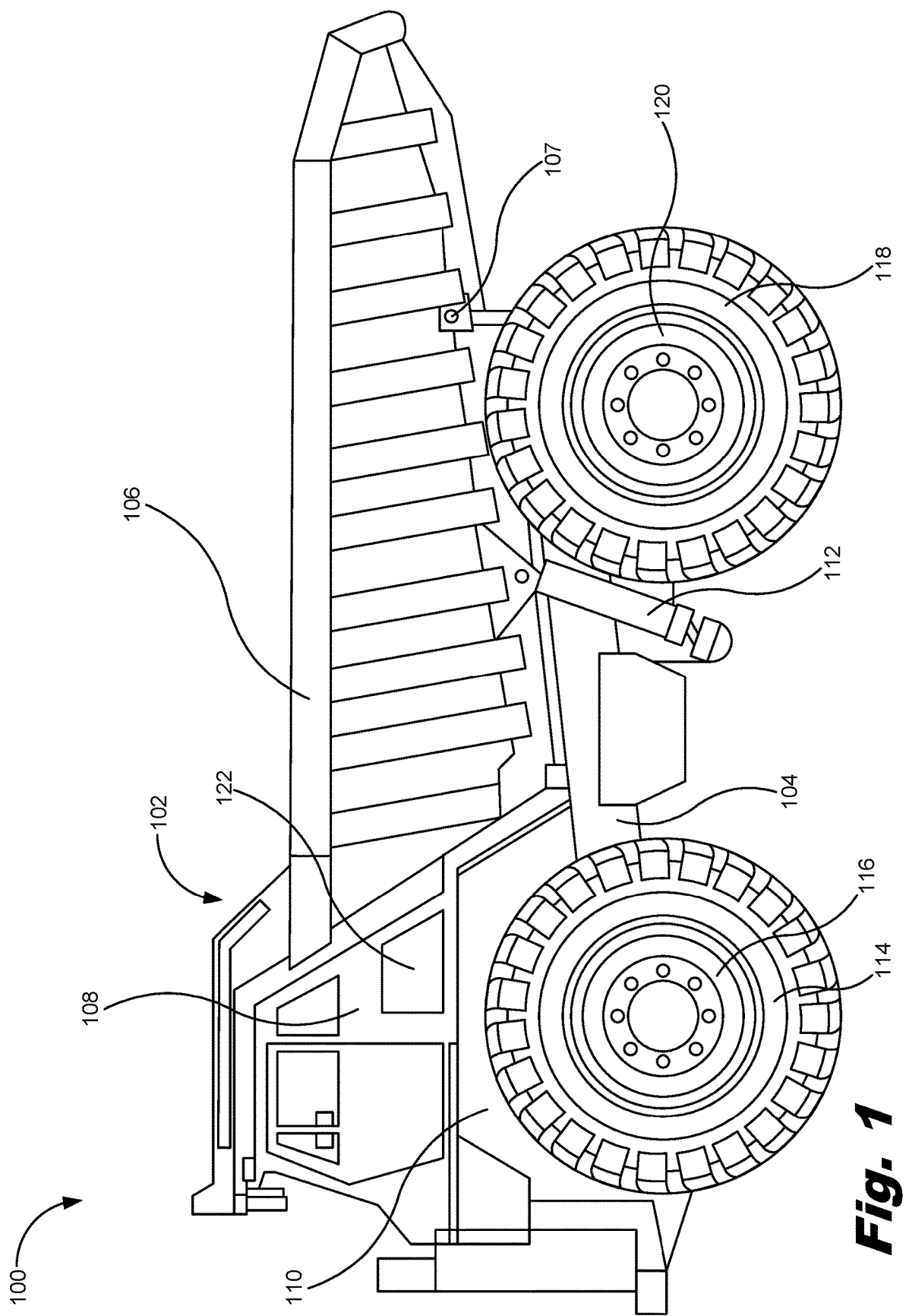
FIG. 1 is a schematic illustration of a system in accordance with an example of the present disclosure.

Wherever possible, the same reference numbers will be used throughout the drawings to refer to the same or like parts. Referring to FIG. 1, a system 100 in accordance with an example of the present disclosure may include a machine 102. In some examples, the system 100 may not include a machine 102. In this example, the system 100 may be sold or provided as a service to a user where the user utilizes the machines 102 within the system 100. In other words, the machines 102 may not be included within the system 100, but may be used within the system 100 as the system 100 functions as described herein.

The machine 102 may be a vehicle such as the machine 102 illustrated in FIG. 1, although features disclosed herein may be utilized with other types of machines. As used herein and in the appended claims, the term "machine" is meant to be understood broadly as any vehicle or machine of any kind. The machine 102 depicted in FIG. 1 is a hauling machine such as an off-highway mining truck. The features of the system 100 disclosed herein may be utilized with other types of machines 102.

The machine 102 illustrated in FIG. 1 includes a main frame 104, a dump body 106 pivotally mounted to the main frame 104 via a pivot 107, and an operator cab 108 mounted on the front of the main frame 104 above an engine enclosure 110. A hydraulic or pneumatic system 112 may be included to move the dump body 106 relative to the main frame 104 in order to dump material that may be carried within the dump body 106.

The machine 102 may be supported on the ground or other support surface by front tires 114 (one shown) each mounted on one of two front wheel assemblies 116, and rear tires 118 (one shown) each mounted on one of two back (driven) wheel assemblies 120. One or more engines or other prime movers (not shown) may be housed within the engine enclosure 110 to supply power to the driven wheel assemblies 120 via a mechanical or electric drive train.

The system 100 along with the machine 102 (i.e., the haul truck) function therein may further include an electronic control module ("ECM") 122 including any machine controlling device configured to control functions of the machine 102 or a portion of the machine 102 including, for example, an engine of the machine 102. In some examples, controlling movement of the machine 102 may include adjusting the machine 102 or a portion of the machine 102 (e.g., an attachment), adjusting the direction of movement, increasing speed of movement, decreasing speed of movement, stopping movement and/or the like. While the following detailed description and drawings are made with reference to the depicted machine 102, the teachings of this disclosure may be employed on other vehicles and machines for which movement or operation of the vehicle, machine, or portion of the machine (e.g., attachments on the machine), may be controlled. In the examples described herein, the machine 102 may include parts or sub-systems that may be coupled to or replaced as the parts or sub-systems of the machine 102 wear or become consumed or expended.

The ECM 122 may be any device used to control functions of one or more of the parts or subsystems of the machine 102, and may be used to detect whether a part is a genuine (i.e., authentic or manufacturer approved). In the examples described herein, the ECM 122 may be any data processing device that controls the machine 102 and parts included within the machine 102. An ECM may include an electronic controller in the form of at least one microprocessor having various types of memory components which may include volatile random-access memory ("RAM"), and nonvolatile read-only memory ("ROM"), flash erasable programmable read-only memory ("EPROM") or electrically erasable programmable read-only memory ("EEPROM") memories, other data storage devices, and combinations thereof. The data storage devices of the ECM 122 may include software code instruction sets, which are executed to perform various control and information functions including the functions described herein. Further the data storage devices of the ECM 122 may also include data tables, data maps, look-up tables, neural networks, algorithms, machine learning algorithms, and/or other components relating to the operation of the systems and methods described herein. The microprocessor(s) of the ECM 122 may communicate with engine componentry of the engine of the machine 102 and other devices outside the ECM through an input and output ("I/O") driver. Such I/O drivers protect the ECM 122 from hostile electrical impulses while permitting the signals and power for engine control, for example, to be transmitted through the interface. The ECM componentry may be interconnected by a number of data, address, and control buses to, for example, systems and subsystems of the machine 102 including the sensor array 220 described herein. An addressing and data structure may be implemented to permit communication between the ECM 122 over the buses. In this manner, the ECM 122 and the various components of the ECM 122 serve to transmit signals and data to and from the sensor array 220.

In the examples described herein, the sensor array 220 may be coupled to any portion of the machine 102 in order to detect the presence of a part of the machine 102. These parts such as the fluid filter 202 included as an example herein may include any part that is replaceable within the machine 102 and is not limited to the exemplary fluid filter 202. For example, the ECM 122 and sensor array 220 may be associated with and used to detect any part within the machine 102 such as the main frame 104, the dump body 106, the operator cab 108, the engine enclosure 110, the hydraulic or pneumatic system 112, the front tires 114, the front wheel assemblies 116, the rear tires 118, the back wheel assemblies 120, parts included within each of the above-listed parts, other parts within the machine 102, and combinations thereof. The parts the ECM 122 and sensor array 220 may be associated with may include a consumable part. A consumable part may be any part that is replaced as a regular part of maintenance of the machine 102 and may include, for example, the fluid filter 202, the front tires 114, the rear tires 118, a fuel filter, an engine air filter, a cabin air filter, engine belts, and spark plugs, among other consumable parts. The parts the ECM 122 and sensor array 220 may be associated with may include a non-consumable part. Examples of a non-consumable part may include major and minor components such as the main frame 104, the dump body 106, the operator cab 108, the engine enclosure 110, the hydraulic or pneumatic system 112, the front wheel assemblies 116, the back wheel assemblies 120, individual parts within the engine of the machine 102, or other more permanent or semi-permanent parts within the machine 102.

In some examples, the ECM 122 may send a signal to the sensor array 220 to detect the identification device array 230, and, initially, if the identification device array 230 is present. In situations where the identification device array 230 is not present, the sensor array 220 may not detect the identification device array 230 and may send a null signal back to the ECM 122. The null signal may be indicative of no fluid filter 202 being present or coupled to the machine 102, that the fluid filter 202 does not contain the identification device array 230 and is not an acceptable fluid filter or part, or that the fluid filter 202 is not installed properly.

It may be the objective of the owner or manufacturer of the machine 102 to ensure that acceptable parts are coupled to and used in the machine 102. An acceptable part 202 may include a genuine part such as an authentic or manufacturer-approved part or an OEM part. Ensuring that acceptable parts are used helps to ensure that the proper specifications are met in the part. For example, in the case where the part 202 is the fluid filter 202 described herein, the fluid filter may include a specific filter media 207 used to entrap and sequester suspended contaminants within the oil circulated within the engine of the machine 102. Throughout the description the terms part and fluid filter will be used interchangeably. This filter media 207 may have a specific porosity, pore size within the filter media 207, the material from which the filter media 207 is made, the structural integrity of the filter media 207 as it relates to the ability to prevent the passage of oil through an unfiltered flow path, the number of pleats within the filter media used to increase the surface area of fluid filtering, and other characteristics of the fluid filter 202 that achieves optimal performance in the engine of the machine 102. Thus, an unacceptable part may include any part that does not conform to a manufacturer's specifications and does not have one or more of a number of specified characteristics. Use of an unacceptable part within the machine 102 may result in decreased performance within the machine 102, damage to parts within the machine 102, or other undesirable conditions. Thus, it may be in the best interests of the manufacturer and/or the owner of the machine 102 to ensure that acceptable parts are used within the machine 102. The present systems and methods assist the manufacturer and/or the owner of the machine 102 in these endeavors.

In instances where the ECM 122 detects an unacceptable part or the lack of a part altogether, the ECM 122 may cause the machine 102 to function at a lower performance in order to mitigate any damage that may occur through the use of the unacceptable part or the lack of the part altogether. These lower performance states may be referred to as failure modes and may include, for example, a limp home mode where the ECM 122 controls a maximum revolutions per minute ("rpm") of the engine within the machine 102, the throttle conditions and states available to the operator, the maximum speed at which the machine 102 may be operated, the functioning of a transmission of the machine 102, and other operating parameters of the machine 102. Further, the interval between services of the machine 102 and the fluid filter 202 may be decreased. In this example, the owner, service technician, or manufacturer may be notified at an adjusted time interval as to when servicing of the machine 102 is due. In some examples, use or continued use of an unacceptable part as detected by the ECM 122 and the sensor array 220 may result in the voiding of warranties associated with one or more parts, systems, or subsystems within the machine 102, and data relating to the use of an unacceptable part within the machine 102 may be stored within a data storage device of the ECM 122.

Parts or subsystems within a machine 102 that are not genuine may perform within the engine of the machine, for example, at a lower or otherwise undesirable performance level. This may cause the system 100 including the machine 102 and the engine of the machine 102 to operate at a diminished performance level, and may also damage the machine 102, the engine of the machine and systems and sub-systems thereof. Therefore, manufacturers of the machine 102 and/or the engine of the machine 102 may recommend the utilization of OEM or approved parts to ensure that the machine 102 does not fail and to ensure that any goodwill associated with the functioning of the machine 102 is maintained and preserved.

Figure 2:
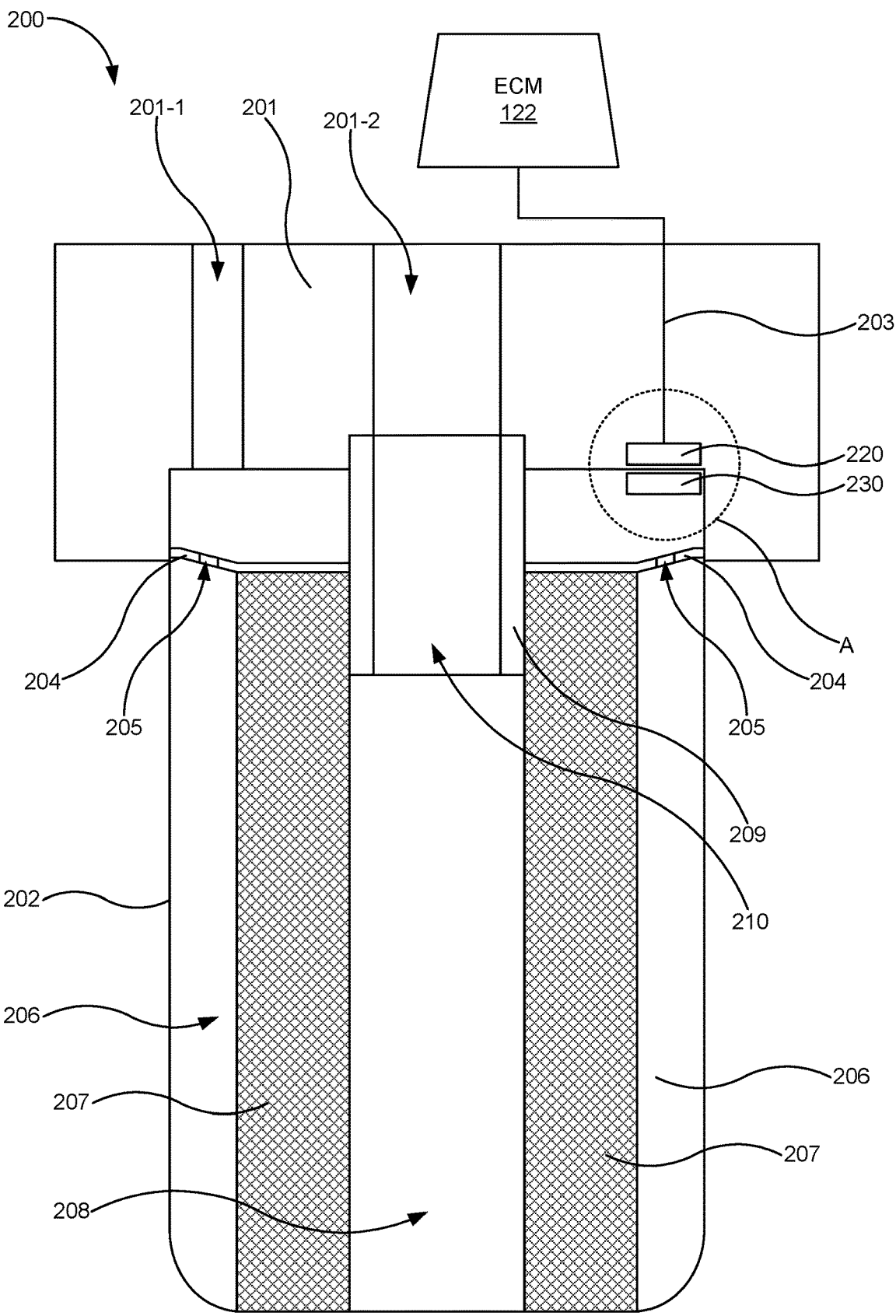
FIG. 2 is a schematic illustration of a part identification system of the system of FIG. 1 in accordance with an example of the present disclosure.

In order to ensure that the machine 102 is able to consistently function at an intended performance level, the present disclosure describes systems and methods for identifying a part, and performing subsequent operations relating the functioning of the machine 102 and its engine. FIG. 2 is a schematic illustration of a part identification system 200 of the system 100 of FIG. 1 in accordance with an example the present disclosure. The part identification system 200 is described herein in connection with a fluid filter 202 such as an oil filter. However, the present systems and methods may be applied to a number of different filters (e.g., air filters, etc.), and to any additional part of the machine 102.

The fluid filter 202 of the example of FIG. 2 may be mechanically, fluidically, and/or communicatively coupled to the machine 102. For example, the fluid filter 202 may be mechanically coupled to a filter base 201 of an engine of the machine 102. Mechanical coupling of the fluid filter 202 to the filter base 201 may be achieved through any type of fastening system including, for example, a clamp used to clamp the fluid filter 202 to the filter base 201, a threaded plate formed on the fluid filter 202 that may be threadedly coupled to a threaded bolt formed on the filter base 201, or other coupling systems and methods.

The fluid filter 202 may also be fluidically coupled to the filter base 201 of the engine of the machine 102. The filter base may include a first base fluid channel 201-1 through which fluid to be filtered by the fluid filter 202 may enter into the fluid filter 202. The fluid may move through a cover plate aperture 205 defined within a cover plate 204 of the fluid filter 202. The fluid may then enter into a first filter fluid channel 206.

The fluid may be directed to pass through a filter media 207. The fluid may enter the second filter fluid channel 208 after being filtered via the filter media 207 and may again enter the engine of the machine 102 via a fluid drain channel 210 defined within a fluid drain 209 and a second base fluid channel.

The filter media 207 within a genuine, OEM fluid filter may include a specification-based filter media 207 that is defined by the manufacturer in order to ensure that those specific characteristics are included the fluid filter 202. For example, the characteristics of the filter media 207 may include a porosity of the filter media 207, a thickness of the filter media 207, and material(s) used to make the filter media 207, among other characteristics that may affect the effectiveness and efficiency of the fluid filter 202 as a device used to remove contaminants from the fluid. Thus, a manufacturer may desire to ensure that the fluid filter 202 is an OEM product or at least includes characteristics of the OEM fluid filter. As will be described in greater detail below, the ECM 122, a sensor array 220 operably connected to the ECM 122, and an identification device array 230 included within the fluid filter 202 may be used to identify the fluid filter 202 installed within the machine 102.

As shown in FIG. 2, the fluid filter 202 may be communicatively coupled to, for example, the ECM 122 via the identification device array 230 included within the fluid filter 202, the sensor array 220 included within the machine 102, and a communication path 203 coupled to the ECM 122. In such examples, signals may be transmitted between the sensor array 220 may be transmitted from the sensor array 220 to the ECM 122 via the communication path 203. Further, the ECM 122 may transmit signals to the sensor array 220 in order to instruct the sensor array 220 to identify the fluid filter 202. In the examples described herein, the identification device array 230 may be sensed or read by the sensor array 220 and may include a number of variables as a code defining at least one physical characteristic of the fluid filter 202. Further, in the examples described herein, the sensor array 220 and identification device array 230 may be placed in a position relative to one another when the part (i.e., fluid filter 202) is properly and correctly seated or coupled to the machine 102. Further, the identification device array 230 may be either coupled to an exterior of the fluid filter 202, or at least partially embedded within a portion of the fluid filter 202.

Figure 3:
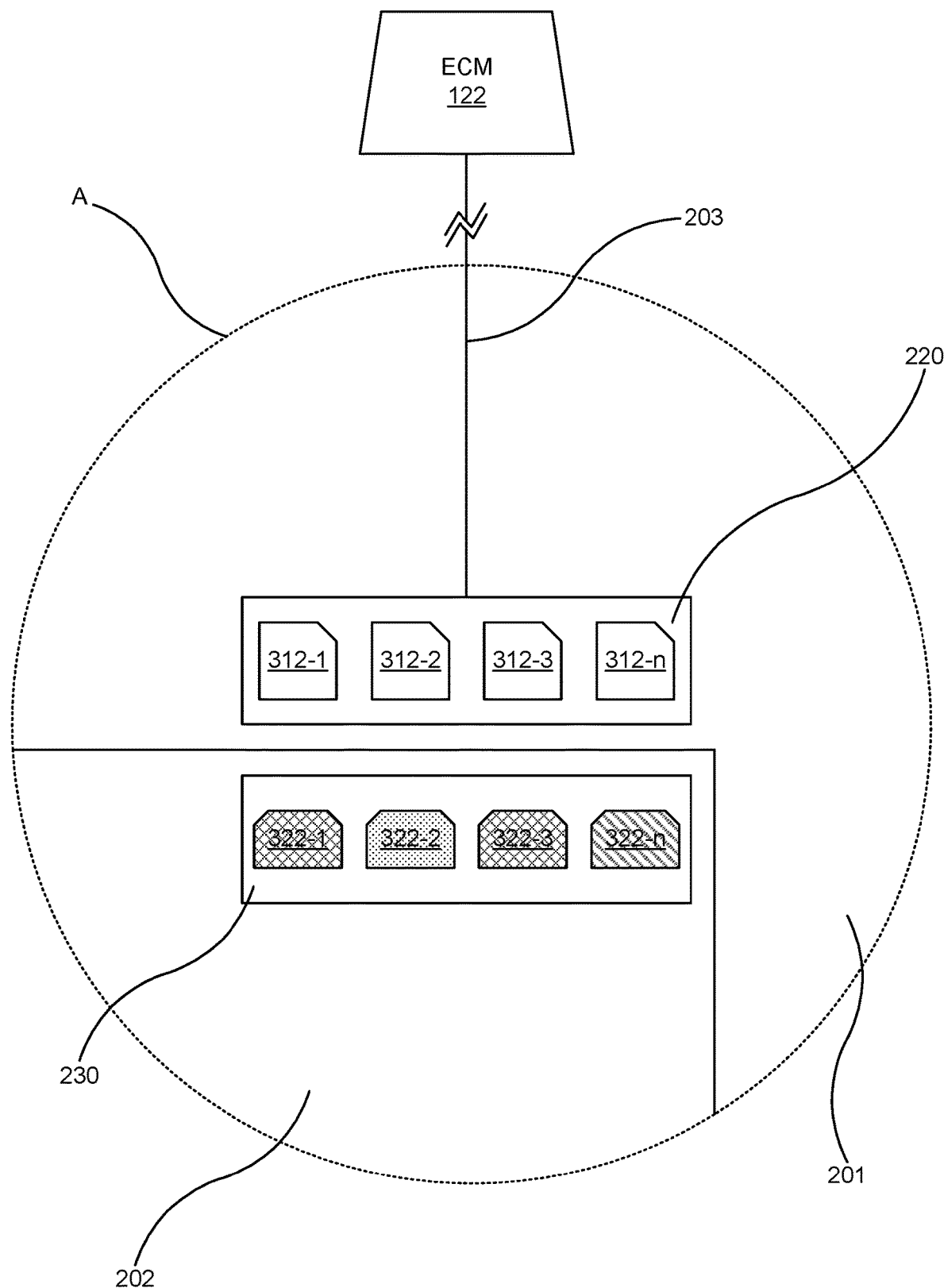
FIG. 3 is a close-up schematic illustration of the part identification system of FIG. 2 in accordance with an example of the present disclosure.

FIG. 3 is a close-up schematic illustration of a portion of the part identification system 200 of FIG. 2 in accordance with an example of the present disclosure. Specifically, FIG. 3 includes a close-up view of the sensor array 220 formed on or within the filter base 201, and the identification device array 230 formed on or within the fluid filter 202. The sensor array 220 includes at least one sensor 312 and may, in one example, include a plurality of sensors 312-1, 312-2, 312-3, . . . 312-n (collectively referred to herein as "sensors" 312). Further, the identification device array 230 includes at least one the identification device 322 and may, in one example, include a plurality of identification devices 322-1, 322-2, 322-3, 322-n (collectively referred to herein as "devices" 322). The "n" in connection with the reference numbers 312-n and 322-n indicate that any number of sensors 312 and identification devices 322 may be included in the sensor array 220 and the identification device array 230, respectively, from one to "n" sensors 312 and identification devices 322. In one example, the number of sensors 312 and the number of identification devices 322 is equal such that each sensor 312 is sensing a corresponding identification device 322.

The sensor(s) 312 within the sensor array 220 may be instructed by the ECM 122 to sense the identification devices 322 within the identification device array 230. In the examples described herein, the data storage devices of the ECM 122 may store data defining the part 202 based on the code obtained from the sensor array 220 and identification device array 230 as described herein.

In some instances, unacceptable fluid filters 202 may be coupled to the filter base 201 of an engine of the machine 102. In these instances, the unacceptable fluid filter 202 may not include an identification device array 230. In these instances, the sensor array 220 as controlled by the ECM 122 will simply detect the null signal as described herein. However, in some instances, an unacceptable fluid filter 202 may include an identification device array 230. In these instances, the sensor array 220 may detect the identification device array 230 and send a signal indicative of the detected identification device array 230 to the ECM 122. The ECM 122 may then refer to data stored in an associated data storage device to determine whether the detected signal from the unacceptable fluid filter 202 indicates that the unacceptable fluid filter 202 is an acceptable part or not. In this instance, the ECM 122 will determine that the unacceptable fluid filter 202 is, in fact, an unacceptable part, and may take remedial actions including notification to a user, a service professional replacing the fluid filter 202, a manufacturer, an owner of the machine 102, or combinations thereof. The remedial actions may also include the restriction by the ECM 122 of the machine 102 to operating at a lower performance states. Further, the remedial actions may also include voiding of warranties associated with the machine 102 and any system of subsystem therein.

In instances where the fluid filter 202 does include an identification device array 230 and is an acceptable part, the sensor array 220 as controlled by the ECM 122, will detect a unique code as provided by the identification devices 322 of the identification device array 230. The unique code defined by the identification devices 322 and sensed by the sensors 312 of the sensor array 220 may include a number of binary 1's and 0's, for example. For example, the code read from the individual identification devices 322 of the identification device array 230 by the sensor array 220 may be [1,0,−1,1] where each value is obtained from the individual identification devices 322. In the example of FIG. 3, the first identification device 322-1 may be detected by the first sensor 312-1 as a 1, the second identification device 322-2 may be detected by the second sensor 312-2 as a 0, the third identification device 322-3 may be detected by the third sensor 312-3 as a −1, and the fourth identification device 322-4 may be detected by the fourth sensor 312-4 as a 1 in this example. This code may be transmitted to the ECM 122 which will determine that the acceptable fluid filter 202 is, in fact, an acceptable part based on reference to the data stored in an associated data storage device.

In one example, the variables within the code defined by the identification devices 322 within the identification device array 230 may each signify one or more characteristics of the fluid filter 202 such as size of the fluid filter 202, characteristics of the filter media 207, a unique or non-unique serialized number associated with the fluid filter 202, an age of the fluid filter 202, a manufacturer of the fluid filter 202, a data of manufacture of the fluid filter 202, and a performance level or quality of the fluid filter 202 (low, medium, or high performance level), among other types of information associated with the fluid filter 202. Further, more digits within the code produced by the identification device array 230 and detected by the sensor array 220 may be increased through the inclusion of additional sensors 312 and identification devices 322. In examples where additional sensors 312 and identification devices 322 are included, information regarding a unique serialized number of the fluid filter 202, length of time since replacement of the fluid filter 202, among other types of information.

The ECM 122 may activate or otherwise instruct the sensor array 220 to detect the identification device array 230 at any time before, during, and after operation of the machine 102. For example, the ECM 122 may activate or otherwise instruct the sensor array 220 to detect the identification device array 230 during servicing of the machine 102, when the machine 102 is turned on, or at specified time intervals, among other detection times.

With reference to the sensor array 220 and the identification device array 230, in one example, the sensors 312 may be Hall effect sensors. A Hall effect sensor is any device that is used to measure the magnitude of a magnetic field. Thus, in this example, the identification devices 322 of the identification device array 230 may include a magnetic field-inducing material. The magnetic field-inducing material may be a magnet, a composite magnet, a ceramic magnet, a rare-earth magnet, a permanent magnet, an electromagnet, and other types of magnetic field-inducing materials and devices. In this example, the Hall effect sensors 312 may measure at least one property of the magnetic field-inducing material. The output voltage of each of the Hall effect sensors 312 may be directly proportional to the at least one magnetic property of the magnetic field-inducing material. This output voltage produced by the Hall effect sensors 312 may be transmitted to the ECM 122. As each of the identification devices 322 produces a different magnetic field with differing magnetic properties, the output voltages from the identification devices 322 may vary to produce the code that is read by the ECM 122. This code may be used by the ECM 122, in reference to the data stored in the associated data storage device, to determine exactly what fluid filter 202 is coupled to the filter base 201 and the characteristics of the fluid filter 202.

The plurality of identification devices 322 may include at least a first magnetic field-inducing material and a second magnetic field-inducing material where the first magnetic field-inducing material produces a first magnetic field having a first electromagnetic characteristic, and the second magnetic field-inducing material produces a second magnetic field having a second electromagnetic characteristic different from the first electromagnetic characteristic. A difference between the first electromagnetic characteristic and the second electromagnetic characteristic defines at least one component of the code. In other words, differentiation between the electromagnetic characteristics of the magnetic field-inducing materials within the identification devices 322 allows for the formation of the code in the form of 1's, −1's and 0's such as in the four set digits of [1,0,−1,1] where each digit is obtained from a respective one of the identification devices 322. In this manner, the different magnetic fields produced by the identification devices 322 and sensed by the Hall effect sensors 312 serves as a primary variable in the data defining the code.

In one example where the sensors 312 are Hall effect sensors, and the identification devices 322 are magnetic field-inducing materials, the characteristics or properties of the magnetic fields produced by the magnetic field-inducing materials and detected by the Hall effect sensors 312 may serve as additional variables within the code. For example, the magnitude, strength, magnetic moment, direction of the magnetic moment, magnetic polarity, magnetic flux density, other magnetic properties of the identification devices 322, and combinations thereof may serve as the characteristics or properties of the magnetic fields produced by the magnetic field-inducing materials and may be used to distinguish between the individual identification devices 322 and may serve as additional information points or variables within the code to further define characteristics of the fluid filter 202 to which the identification device array 230 is coupled. In this manner, a large amount of data may be stored within the arrangement of the identification devices 322 in order to provide large amounts of information for consumption and analysis by the ECM 122.

In another example, the sensors 312 of the sensor array 220 may be optical sensors. An optical sensor 312 may be any device that can detect electromagnetic radiation and may include, for example, a charge-coupled device ("CCD"), a photoresistive device, a phototransistor device, a photodiode, among other optical sensors 312. In this example, the identification device array 230 may include a number of light emitting or light reflecting identification devices 322. In one example, the light emitting identification devices 322 may include, for example, light emitting diodes ("LEDs"), micro-LEDs, nano-LEDs, lasers, and other types of light emitting devices. In one example, the optical sensors 312 within the optical sensor array 312 may measure a number of properties of the electromagnetic radiation emitted by the light emitting identification devices 322 and may transmit data representing the code. In one example, the properties of the electromagnetic radiation may include, for example, wavelength, frequency, phase, intensity, propagation direction, and polarization, among other properties of the electromagnetic radiation. In one example, the plurality of identification devices 322, in this example, include at least a first identification device and a second identification device where the first identification device produces a first wavelength of electromagnetic radiation, the second identification device produces a second wavelength of electromagnetic radiation different from the first wavelength of electromagnetic radiation, and the difference between the first wavelength and the second wavelength defines the at least one component of the code. Again, the code defined by the identification devices 322 and sensed by the sensors 312 of the sensor array 220 may include a number of binary 1's and 0's, for example. Thus, in this example, the code read from the identification device array 230 by the sensor array 220 may be [1,0,−1,1] where each value is obtained from the individual identification devices 322 as the difference in properties between the first wavelength and the second wavelength is detected. In this manner, the different wavelengths of electromagnetic radiation produced by the identification devices 322 and sensed by the optical sensors 312 serves as a primary variable in the data defining the code.

Further, in one example, the code may be defined by differences between the properties of the electromagnetic radiation emitted by the light emitting identification devices 322, and these additional properties of the electromagnetic radiation may serve as additional variables within the code. The properties of the electromagnetic radiation may include, for example, wavelength, frequency, phase, intensity, propagation direction, and polarization, among other properties of the electromagnetic radiation. The plurality of light emitting identification devices 322 may emit light with a number of these properties that are different from one another to define the additional variables within the code.

As each of the identification devices 322 produces electromagnetic radiation with different properties, the optical sensors 312 may translate those values into different voltage signals. The voltage signals output from the optical sensors 312 may be transmitted to the ECM 122 via the communication path 203, and the code defined by the differences in the properties is read by the ECM 122. This code may be used by the ECM 122, in reference to the data stored in the associated data storage device, to determine exactly what fluid filter 202 is coupled to the filter base 201 and the characteristics of the fluid filter 202. Further, the different properties of the electromagnetic radiation may serve as additional information points or variables within the code to further define characteristics of the fluid filter 202 to which the identification device array 230 is coupled. For example, the wavelengths of electromagnetic radiation detected by the optical sensors 312 within the sensor array 220 and the second wavelength includes a number of secondary characteristics including, for example, radiometry values and photometry values. The secondary characteristics may define at least one component of the code.

As mentioned herein, the identification device array 230 may include a number of light reflecting identification devices 322. In this example, the light reflecting identification devices 322 may include reflective surfaces formed on the fluid filter 202 such as mirrors. The reflectivity, transmissivity, concavity, convexity, and other properties of the mirrors may serve to differentiate between the light reflecting identification devices 322 which the sensors 312 of the sensor array 220 may distinguish and which the ECM 122 may identify as separate portions or variables within the code.

The code identified by the sensors 312 of the sensor array 220 vis-à-vis the electromagnetic energy generated by or detected from the identification devices 322 of the identification device array 230 may be used by the ECM 122 in determining whether the fluid filter 202 to which the identification device array 230 is coupled is an acceptable part. In this manner, the machine 102 and its systems and subsystems may be protected by ensuring that acceptable parts are used therein. Further, the remedial actions described herein in situations where an unacceptable part is installed further keep the machine 102 operating at a level that protects the machine.

In one example, each of the sensors 312 within the sensor array 220 may detect a corresponding identification device 322 within the identification device array 230. In another example, a sensor 312 may detect a plurality of identification device 322 within the identification device array 230. Further, although in some examples, an identification device 322 may be included within the part 202, the provision of a plurality of identification devices 322 within an identification device array 230 allows for more data to be coded using the plurality of identification devices 322 which in turn allows for additional information to be provided to the ECM 122.

In one example, the code obtained from the identification devices 322 on the part (i.e., the fluid filter) by the ECM 122 may define a trim file or other electronic data file for use in operating the part within the machine 102. In this example, the code obtained from the sensor array 220 may be used by the ECM 122 to search trim files stored within the storage device associated with the ECM 122. The ECM 122 may call up and execute the trim file based on the code obtained from the identification devices 322 on the part. Further, the ECM 122 may use or executed the to determine how to instruct the part to function or allow the part to function within the machine 102. For example, if the part were a fuel injector, the trim file may define (as executed by the ECM 122) how long the fuel injector injects fuel in a cylinder of the engine of the machine 102.

Figure 4:
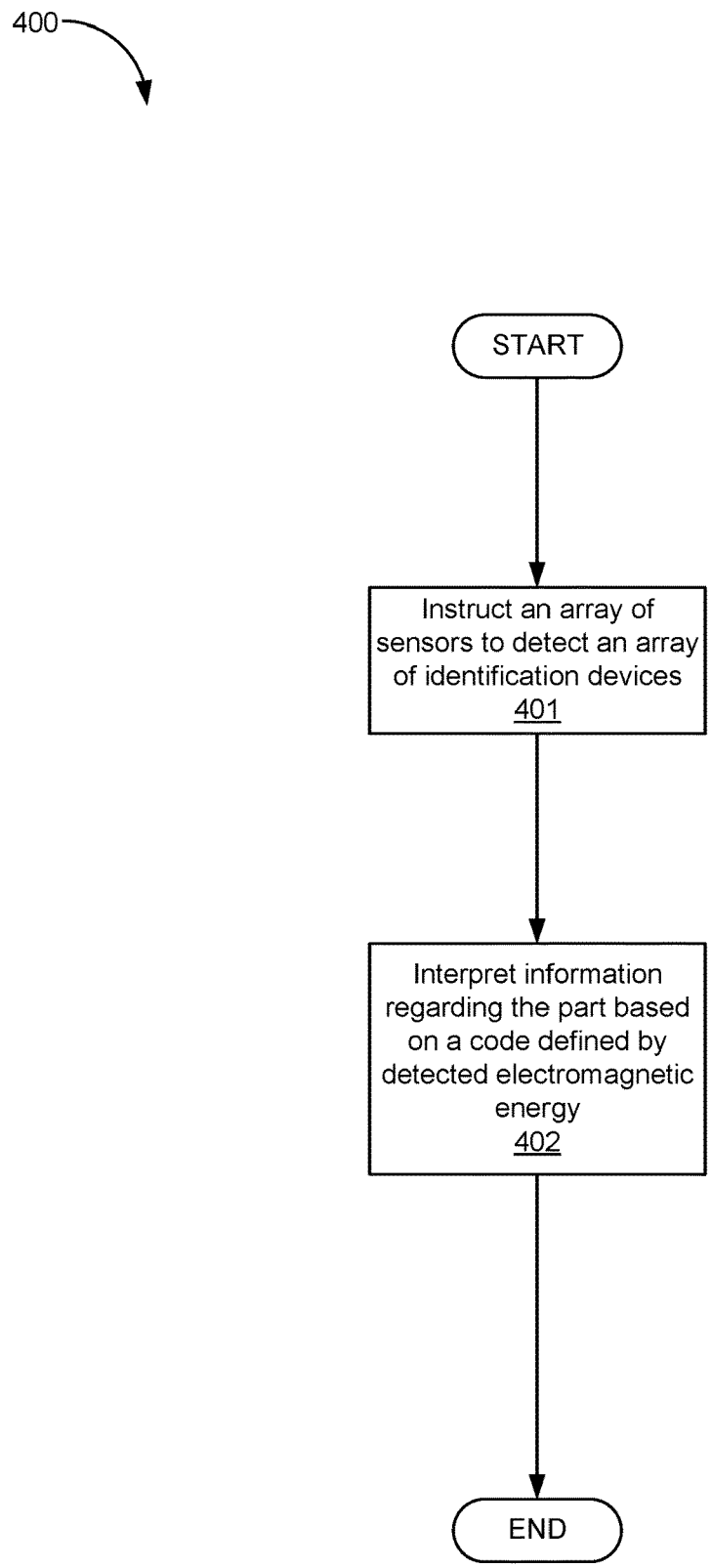
FIG. 4 is a flow chart depicting an example method associated with the system shown in FIGS. 1 through 3.

FIG. 4 is a flow chart depicting an example method 400 associated with the system 100 and the various components shown in FIGS. 1-3. As shown in FIG. 4, in the example method 400, at 401 the ECM 122 may cause and/or otherwise instruct one or more sensors 312 of the sensor array 220 to detect the identification devices 322 of the identification device array 230. At 402, the ECM 122 may identify information regarding the part (i.e., the fluid filter 202) based on the code defined by the electromagnetic energy produced by the array of identification devices and detected by the sensors 312 of the sensor array 220. The code defines at least one physical characteristic of the part as described herein.

Figure 5:
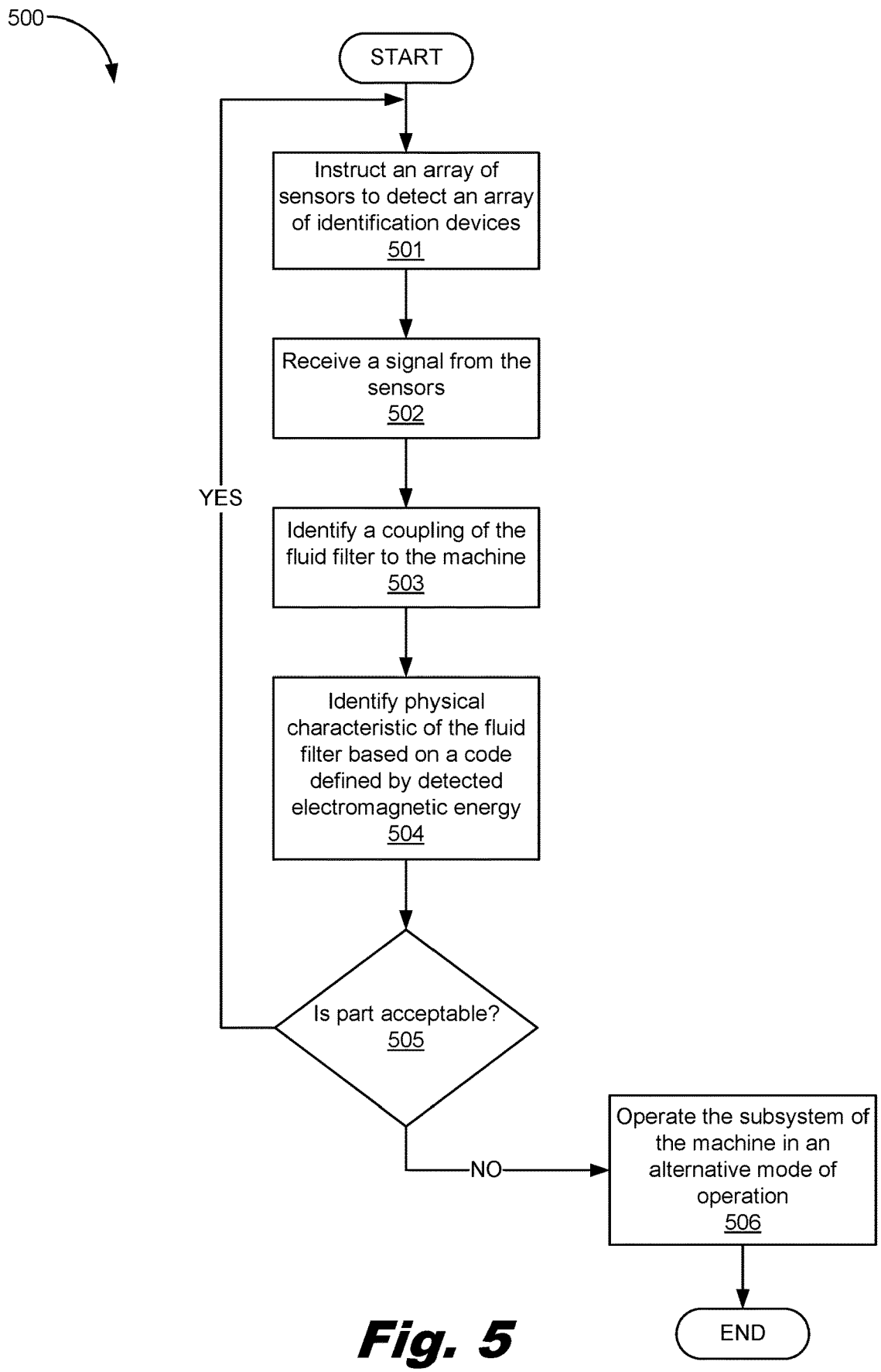
FIG. 5 is a flow chart depicting another example method associated with the system shown in FIGS. 1 through 3.

FIG. 5 is a flow chart depicting an example method 500 associated with the system 100 and the various components shown in FIGS. 1 through 3. As shown in FIG. 5, in the example method 500, at 501 the ECM 122 may cause and/or otherwise instruct one or more of the sensors 312 of the sensor array 220 to detect the identification devices 322 of the identification device array 230. At 502, the ECM 122 may receive a signal from the sensors 312. In one example, the signal includes data defined by variations in amplitude, phase, sequence of pulses, continuously varying waveforms, or other properties of the signal.

At 503, the ECM 122 may identify a coupling of the fluid filter 202 to the machine 102. This identification of the coupling informs the ECM 122 that a part such as the fluid filter 202 is ready to be analyzed and triggers the ECM 122 to instruct the sensors 312 within the sensor array 220 to detect the identification devices 322 within the identification device array 230.

The ECM 122, at block 504, may identify information regarding the part (i.e., the fluid filter 202) based on the code defined by the electromagnetic energy produced by the array of identification devices and detected by the sensors 312 of the sensor array 220. The code defines at least one physical characteristic of the part as described herein.

At 505, the ECM 122 may determine whether the part 202 installed in the machine 102 is an acceptable part or not. The ECM 122 may make this determination at 505 by searching the data tables, data maps, look-up tables, neural networks and other type of data array stored within the data storage devices of the ECM 122. The ECM 122 may determine whether the code detected by the sensor array 220 from the identification device array 230 is listed as indication an acceptable part. The data array includes at least one pre-approved code defining whether the part is the approved part. In instances where the part is an acceptable part (505, determination YES), the method 500 may loop back to before 501 to allow the ECM 122 to perform 501 through 504. The looping back to before block 501 may occur any number of iterations as defined by the programming of the ECM 122 and software associated therewith, and may occur during servicing of the machine 102, when the machine 102 is turned on, or at specified time intervals, among other detection times.

In contrast, in response to a determination that the part 202 installed in the machine 102 is not an acceptable part (505, determination NO), the method 500 may include, with the ECM 122, instructing operation of the subsystem of the machine 102 in an alternative mode of operation. The alternative mode of operation may include operating the subsystem of the machine 102 or any other part or portion of the machine 102 including the engine of the machine 102 at the lower performance state or failure modes described herein. For example, the alternative mode of operation may include a limp home mode where the ECM 122 controls a maximum rpm of the engine within the machine 102, the throttle conditions and states available to the operator, the maximum speed at which the machine 102 may be operated, the functioning of a transmission of the machine 102, and other operating parameters of the machine 102.

Figure 6:
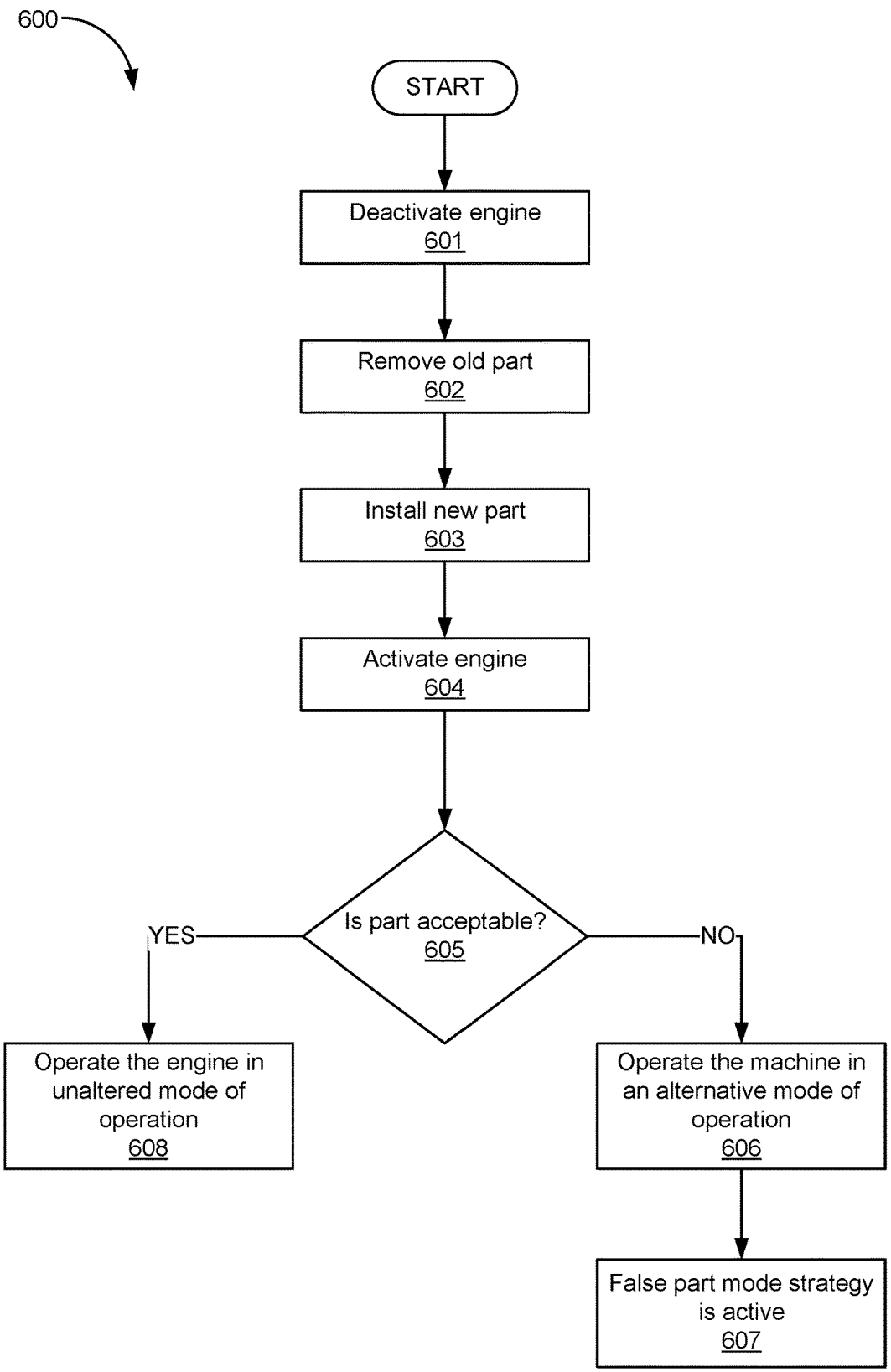
FIG. 6 is a flow chart depicting a further example method associated with the system shown in FIGS. 1 through 3.

FIG. 6 is a flow chart depicting an example method 600 associated with the system shown in FIGS. 1 through 3. The method 600 may include deactivating an engine of the machine 102 at block 601 in order to prepare for the replacement of a part of the machine 102 such as the fluid filter 202. At 602, an old, used part may be removed from the machine 102. In the example of the fluid filter 202, the old, ineffective fluid filter 202 may be removed from the filter base 201. A new part such as a newly manufactured and unused fluid filter 202 may be coupled to the filter base 201 in place of the old, used fluid filter.

The engine of the machine 102 may be activated at 604 and the ECM 122 of the machine 102 may determine whether the part 202 installed in the machine 102 is an acceptable part or not. Again, the ECM 122 may make this determination at 605 by searching a data array stored within the data storage devices of the ECM 122. The ECM 122 may determine whether the code detected by the sensor array 220 from the identification device array 230 is listed as indication an acceptable part. The data array includes at least one pre-approved code defining whether the part is the approved part. In instances where the part is an acceptable part (605, determination YES), the method 600 may include, with the ECM 122, instructing operation of the engine of the machine 102 at an unaltered mode of operation. This is appropriate since the fluid filter 202 includes characteristics that the manufacturer of the machine 102 intended and which is compatible with the manner in which the machine 102 operates.

In contrast, in response to a determination that the part 202 installed in the machine 102 is not an acceptable part (605, determination NO), the method 600 may include operating the subsystem of the machine 102 in an alternative mode of operation as indicated at 606. In this state, a false part mode strategy may be activated at 607. The false part mode strategy may include, with the ECM 122, sending notifications to a number of individuals to inform those individuals of the use of the unacceptable part within the machine 102 and the need to replace that unacceptable part with an acceptable part within a period of time.

INDUSTRIAL APPLICABILITY

The present disclosure describes systems and methods for identifying a part 202 within a machine in 102. More specifically, the present disclosure describes systems and methods for detecting identification devices 322 within an identification device array 230 located on the part 202 with at least one sensor, and using a code defined by the identification devices 322 to determine whether the part is an acceptable or approved part. In one example, the part may be a consumable such as a fluid filter 202 that is mechanically and fluidically coupled to a filter base 201 of an engine of the machine 102, and communicatively coupled to an ECM 122 that controls one or more subsystems of the machine 102. The systems and methods ensure that the identification of the part 202 and whether the part 202 is an acceptable part based on the code received from the identification devices 322 coupled to the part 202.

As a result, the systems and methods of the present disclosure may assist in protecting the machine 102 and the subsystems of the machine 102 including an engine of the machine 102. Further, the systems and methods of the present disclosure assist in ensuring that a part 202 that has appropriate characteristics that cause the machine 102 to function in an optimal manner is used within the machine.

While aspects of the present disclosure have been particularly shown and described with reference to the examples above, it will be understood by those skilled in the art that various additional examples may be contemplated by the modification of the disclosed machines, systems and methods without departing from the spirit and scope of what is disclosed. Such examples should be understood to fall within the scope of the present disclosure as determined based upon the claims and any equivalents thereof.

What is claimed is:

1. A system, comprising:
an electronic control module (ECM) configured to control at least one subsystem of a machine;
a plurality of sensors communicatively coupled to the ECM; and
a memory operably connected to the ECM, the memory storing instructions which, when executed by the ECM, cause the ECM to:
cause a first sensor of the plurality of sensors to sense a first identification device coupled to a fluid filter associated with the subsystem;
cause a second sensor of the plurality of sensors to sense a second identification device coupled to the fluid filter;
receive a first signal from the first sensor based on the first sensor sensing the first-identification device;
receive a second signal from the second sensor based on the second sensor sensing the second identification device;
identify a coupling of the fluid filter to the machine based on the first signal and the second signal; and
identify at least one physical characteristic of the fluid filter based on a code defined by electromagnetic energy generated by the first identification device and the second identification device,
wherein the code includes at least one component identifying the at least one physical characteristic;
the first identification device and the second identification device correspond to a plurality of identification devices coupled to the fluid filter that include a magnetic field-inducing material; and
the plurality of sensors include Hall effect sensors configured to detect a magnetic field induced by the plurality of identification devices;
the plurality of identification devices includes a first magnetic field-inducing material and a second magnetic field-inducing material;
the first magnetic field-inducing material produces a first magnetic field having a first electromagnetic characteristic;
the second magnetic field-inducing material produces a second magnetic field having a second electromagnetic characteristic different from the first electromagnetic characteristic; and
a difference between the first electromagnetic characteristic and the second electromagnetic characteristic defines the at least one component of the code.

2. The system of claim 1, wherein at least one of the first electromagnetic characteristic of the first magnetic field-inducing material and the second electromagnetic characteristic of the second magnetic field-inducing material includes a magnitude, a strength, a magnetic moment, a direction of the magnetic moment, a magnetic polarity, or a magnetic flux density.

3. A system, comprising:
an electronic control module (ECM) configured to control at least one subsystem of a machine;
a plurality of sensors communicatively coupled to the ECM; and
a memory operably connected to the ECM, the memory storing instructions which, when executed by the ECM, cause the ECM to:
cause a first sensor of the plurality of sensors to sense a first identification device coupled to a fluid filter associated with the subsystem;
cause a second sensor of the plurality of sensors to sense a second identification device coupled to the fluid filter;
receive a first signal from the first sensor based on the first sensor sensing the first-identification device;
receive a second signal from the second sensor based on the second sensor sensing the second identification device;
identify a coupling of the fluid filter to the machine based on the first signal and the second signal; and
identify at least one physical characteristic of the fluid filter based on a code defined by electromagnetic energy generated by the first identification device and the second identification device,
wherein the code includes at least one component identifying the at least one physical characteristic; and
wherein the first identification device and the second identification device correspond to a plurality of identification devices coupled to the fluid filter that include electromagnetic radiation emission devices; and the plurality of sensors includes a plurality of optical sensors configured to detect electromagnetic radiation emitted by the plurality of identification devices; and
wherein the first identification device produces a first wavelength of electromagnetic radiation,
the second identification device produces a second wavelength of electromagnetic radiation different from the first wavelength of electromagnetic radiation; and
a difference between the first wavelength and the second wavelength defines the at least one component of the code.

4. The system of claim 1, wherein the memory stores data defining the fluid filter based on the code.

5. The system of claim 1, wherein the ECM causes the machine to:
operate at a first performance level;
determine, based on the code defined by the first identification device and the second identification device, whether the fluid filter is an approved fluid filter; and
operate at a second performance level in response to a determination that the fluid filter is not the approved fluid filter.

6. The system of claim 1, wherein identifying the coupling of the fluid filter to the machine based on at least one of the first signal and the second signal comprises:
determining whether at least one of the first signal or the second signal includes a null value as the at least one component of the code; and
in response to a determination that at least one of the first signal or the second signal includes the null value as the at least one component of the code, identifying an absence of the fluid filter being coupled to the machine or a non-approved fluid filter being coupled to the machine.

7. The system of claim 1, wherein the at least one physical characteristic of the fluid filter identified based on the code includes at least one of a filter media of the fluid filter, a shape of the fluid filter, a size of the fluid filter, and a quality level of the fluid filter.

8. A fluid filter, comprising:
a fluid inlet through which a fluid from a subsystem of a machine flows into the fluid filter;
a fluid outlet fluidly connected to the fluid inlet, the fluid outlet permitting passage of filtered fluid to an engine of the machine; and
a plurality of identification devices coupled to the fluid filter at a location at which at least one sensor located on the engine detects the plurality of identification devices, wherein:
the plurality of identification devices produces electromagnetic energy detectable by the at least one sensor to define a code, and
the code includes at least one component identifying a structure of the fluid filter configured to direct flow of the fluid from the fluid inlet to the fluid outlet;
at least one identification device of the plurality of identification devices includes a first magnetic field-inducing material and a second magnetic field-inducing material;
the first magnetic field-inducing material produces a first magnetic field having a first electromagnetic characteristic;
the second magnetic field-inducing material produces a second magnetic field having a second electromagnetic characteristic different from the first electromagnetic characteristic; and
a difference between the first electromagnetic characteristic and the second electromagnetic characteristic defines the at least one component of the code.

9. The fluid filter of claim 8, wherein at least one identification device of the plurality of identification devices is coupled to an exterior of the fluid filter or is embedded within a portion of the fluid filter.

10. A fluid filter, comprising:
a fluid inlet through which a fluid from a subsystem of a machine flows into the fluid filter;
a fluid outlet fluidly connected to the fluid inlet, the fluid outlet permitting passage of filtered fluid to an engine of the machine; and
a plurality of identification devices coupled to the fluid filter at a location at which at least one sensor located on the engine detects the plurality of identification devices, wherein:
the plurality of identification devices produces electromagnetic energy detectable by the at least one sensor to define a code, and
the code includes at least one component identifying a structure of the fluid filter configured to direct flow of the fluid from the fluid inlet to the fluid outlet; and
the plurality of identification devices includes a first identification device and a second identification device detectable by the at least one sensor;
the first identification device produces a first wavelength of electromagnetic radiation;
the second identification device produces a second wavelength of electromagnetic radiation different from the first wavelength of electromagnetic radiation; and
a difference between the first wavelength and the second wavelength defines the at least one component of the code.

11. The fluid filter of claim 10, wherein:
the first wavelength and the second wavelength include a number of secondary characteristics including a radiometry value or a photometry value; and
the secondary characteristics define the at least one component of the code.

* * * * *